United States Patent [19]
Sapien

[11] Patent Number: 5,326,064
[45] Date of Patent: Jul. 5, 1994

[54] HOLDER FOR PREVENTING SPILLS

[76] Inventor: Hugo C. Sapien, 3122 Peach Tree La., Missouri City, Tex. 77459

[21] Appl. No.: 58,595

[22] Filed: May 7, 1993

[51] Int. Cl.⁵ ............................................. A47K 1/08
[52] U.S. Cl. ............................ 248/311.2; 224/42.43; 248/146
[58] Field of Search .............. 248/311.2, 146, 150, 248/313; 224/42.43, 42.43 R, 275, 281, 282; 297/194; 220/737, 738

[56] References Cited

U.S. PATENT DOCUMENTS

| | | | |
|---|---|---|---|
| 2,963,256 | 9/1957 | Borah | 248/346 |
| 3,532,318 | 10/1970 | Lloyd | 248/311.2 |
| 3,941,237 | 3/1976 | MacGregor | 220/737 X |
| 4,069,996 | 1/1978 | Koziol | 220/737 X |
| 4,721,216 | 1/1988 | Kinder | 248/311.2 X |
| 4,791,030 | 12/1988 | DeMars | 428/542.4 |
| 4,795,211 | 1/1989 | Stern et al. | 297/194 |
| 4,919,381 | 4/1990 | Buist | 220/738 X |
| 5,029,720 | 7/1991 | Bridges | 220/737 |
| 5,052,649 | 10/1991 | Hunnicutt | 224/42.45 R X |
| 5,088,673 | 2/1992 | Chandler | 224/42.45 R X |
| 5,118,063 | 6/1992 | Young, Sr. | 248/311.2 |
| 5,135,195 | 8/1992 | Dane | 248/311.2 |
| 5,207,076 | 5/1993 | Sciarrillo | 220/737 X |

Primary Examiner—J. Franklin Foss
Attorney, Agent, or Firm—John R. Casperson

[57] ABSTRACT

A holder comprises an upper section with a generally longitudinal slot forming a passage through a tubular wall member, a lower section with an open first end and an opposite second end, a connecting means for attaching the upper section with the lower section, and an end closure at the bottom of the lower section is disclosed. In a preferred embodiment, the lower section has a tubular wall member with a generally frustoconical inner surface.

An apparatus comprises a container placed in the holder. In a preferred embodiment, the container may be placed on the connecting means of the holder. In another preferred embodiment, the container may rest on the frustoconical inner surface of the tubular wall member of the lower section of the holder. In yet another preferred embodiment, the container may be positioned on the end closure of the lower section.

A method for decreasing spills from the container comprises positioning the container in the holder; restraining movements of the container inside the holder; directing a spill from the container through an existing annular gap between the outer surface of the container and the inner surface of the holder into a reservoir; and collecting a spill from the container in the annular gap in the holder which serves as the reservoir.

20 Claims, 3 Drawing Sheets

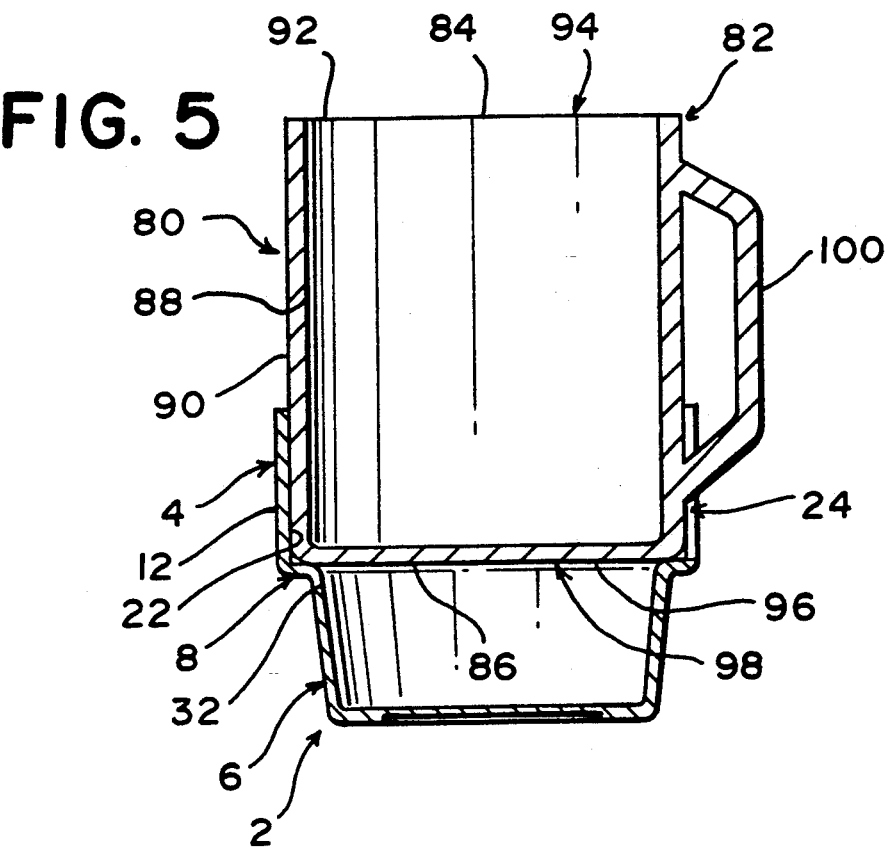
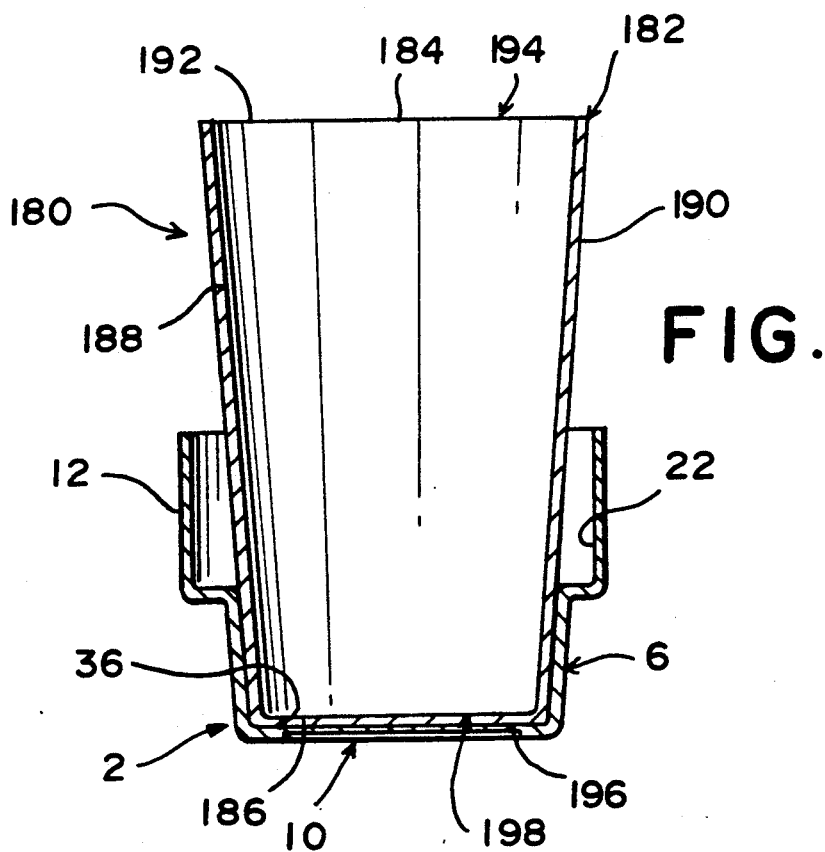

HOLDER FOR PREVENTING SPILLS

BACKGROUND OF THE INVENTION

In one aspect, this invention relates to preventing and/or controlling spills from a container placed in a holder. In another aspect, the invention relates to a holder for containers. In yet another aspect, the invention relates to an adaptor for a container holder.

Many vehicles have a circular socket for accomodating standard sized drink containers. However, these sockets are not always conveniently placed. A drink holder which can be positioned in any one of several places would be very desirable.

The integral drink holders found in many vehicles collect spills and are difficult to keep clean and sanitary. A removable insert for such holders which can be removed and cleaned would be very desirable.

The integral drink holders found in many vehicles further are very large to accomodate a wide range of container sizes. This results in a sloppy fit between the container and the sidewall, and spill can occur when the container is jostled. A holder which closely accomodates containers over a wide size range would be very desirable.

The integral drink holders found in many vehicles also permit the bottom of the container to rest in the bottom of the well. When a spill occurs, the bottom of the container will rest in a pool of liquid—which will drip when the container is removed from the well. A holder which avoids this shortcoming and which can be used to modifiy existing wells would be very desirable.

OBJECTS OF THE INVENTION

It is an object of this invention to provide a reservoir in a holder to collect for any spills from containers such as cups, mugs and the like to keep the bottom of the container from resting in a pool of liquid in vehicles and other means of movement.

It is another object of this invention to prevent spills by designing the holder such that containers of varying sizes and shapes can fit easily in the holder and movements can be decreased.

It is another object of this invention to facilitate the removal of the holder from the console, the disposal of any spills from the container, and the simple cleaning of the holder.

It is another object of this invention to create a more compact, lighter and less expensive holder.

It is yet another object of this invention to provide a mounting means on the outside of the bottom end for the lower section of the holder if a console is not available.

SUMMARY OF THE INVENTION

In one embodiment of the invention, there is provided a holder comprising an upper section, a lower section, a connecting means for connecting the upper section with the lower section, and an end closure at the bottom of the lower section. The upper section of the holder is formed from a tubular wall member having a generally longitudinal slot forming a passage through the tubular wall member. The lower section is formed from a tubular wall member having a generally frustoconical inner surface.

A container may be placed in the upper section of the holder with the bottom end of the container positioned on the connecting means of the holder. The lower section of the holder then may serve as a reservoir for spills from the container.

A container may be placed in the lower section of the holder. When this is done, the bottom end of the container preferably rests on the frustoconical inner surface of the tubular wall member of the lower section of the holder.

A container may also be placed in the lower section of the holder so that the bottom end of the container rests on the end closure of the lower section of the holder.

In a preferred embodiment of the invention, there is provided a method for decreasing spills from a container having liquids. The method comprises positioning the container in a holder such that the container is positioned in the upper section of the holder; restraining movements of the container inside the holder; directing a spill from the container through an annular gap between the outer surface of the generally tubular wall member of the container and the inner surface of the tubular wall member of the holder into the lower section of the holder; and collecting a spill from the container in the holder which serves as a reservoir.

In another preferred embodiment of the invention, there is provided another method for decreasing spills from a container having liquids. The method comprises positioning the container in a holder such that the container is positioned on the frustoconical inner surface of the tubular wall member of the lower section of the holder; restraining movements of the container inside the holder; and collecting a spill in the holder which serves as a reservoir.

In yet another preferred embodiment of the invention, there is provided yet another method for decreasing spills from a container having liquids. The method comprises positioning the container in a holder such that the container is positioned on the end closure of the holder; restraining movements of the container inside the holder; and collecting a spill in the holder which serves as a reservoir.

The lower section of the holder which acts as a reservoir and helps to prevent uncontrolled spills creates an advantage over prior inventions. If the container has a handle and rests on the connecting means attaching the upper section to the lower section, the lower section serves as the reservoir. On the other hand, if the container does not have a handle and rests in the lower section, the annular gap between the outer surface of the generally tubular wall member of the container and the inner surface of the tubular wall member of the holder serves as the reservoir.

Due to lack of attachments to the holder at the upper end or the lower end, the holder is removable, portable and washable. The holder may be simply removed from a console; the liquid collected in the reservoir may be disposed of and the holder may be easily cleaned.

The holder is designed to be manufactured such that cups and containers of varying sizes and shapes may fit in the holder. The existence of the lower section restrains movements of a container with a generally frustoconical tubular wall member or a generally cylindrical wall member with a diameter smaller than the diameter of the lower section when the container is placed inside the lower section of the holder. Such easier fittings restrain movements.

Another advantage of the holder is that it is compact and lightly weighted. The angle of convergence of the lower section of the holder allows easy fitting into consoles of different sizes and shapes. Thus, the need of extra attaching parts which may weigh as much as or more than the holder is not required. Also, due to compactness and light features, the cost of manufacturing of the holder is lower.

A mounting means is not required at the upper end of the holder. If desired, a mounting means can be provided on the outside of the closure for the lower end. Means for attaching the holder to a vehicle frame can be present at the lower end. Generally, such a holder is adapted for attachment to a vehicle by mounting it in a beverage container receptacle which is part of the vehicle or by attaching it to a suitably flat surface on a portion of the vehicle.

BRIEF DESCRIPTION OF THE DRAWINGS

FIG. 5 is a cross-sectional view taken along lines 5—5 of FIG. 2 of the holder with a container positioned in the upper section of the holder.

FIG. 6 is a cross-sectional view taken along lines 5—5 of FIG. 2 of the holder with a container positioned in the lower section of the holder.

DETAILED DESCRIPTION OF THE INVENTION

Figure 1:
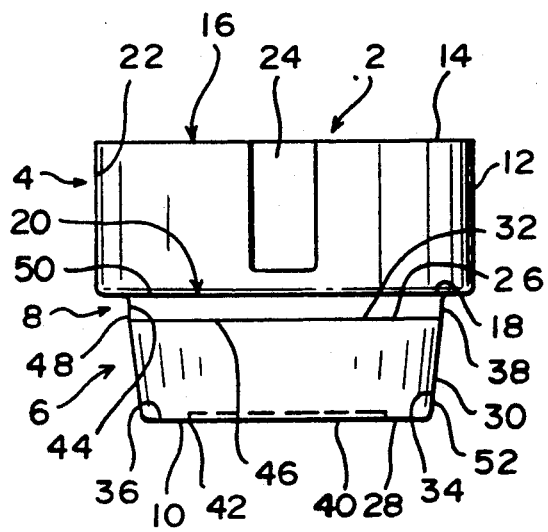
FIG. 1 is a pictorial representation of the front side of a holder which embodies certain features of the present invention.
Figure 3:
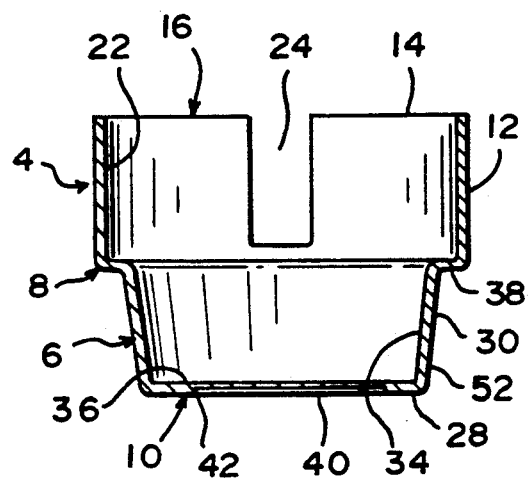
FIG. 3 is a cross-sectional view of the holder taken along lines 3—3 of FIG. 2.
Figure 2:
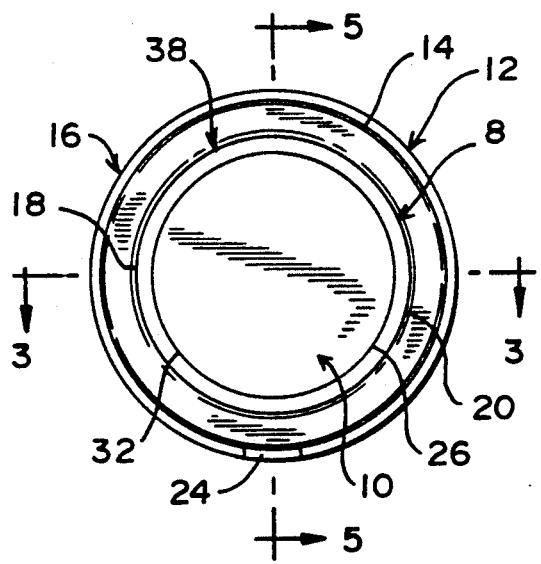
FIG. 2 is a top-view representation of the holder of FIG. 1.
Figure 4:
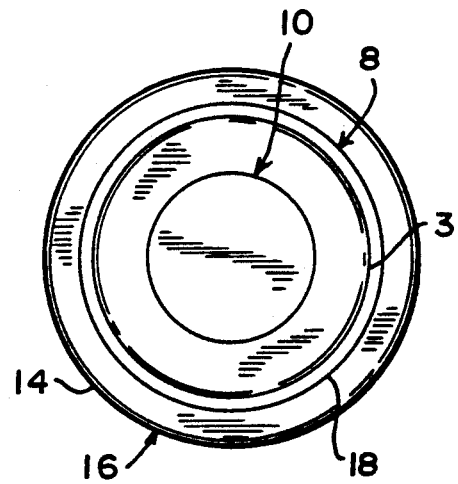
FIG. 4 is a bottom view of the holder.
Figure 7:
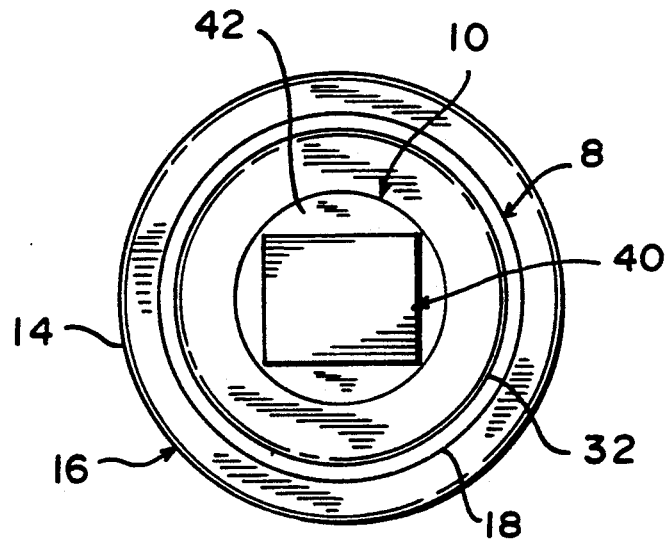
FIG. 7 is a bottom view as in FIG. 4 showing certain features of a preferred embodiment of the invention.

In one embodiment of the invention, there is provided a holder 2 comprising an upper section 4, a lower section 6, a connecting means 8 for connecting the upper section 4 with the lower section 6, and an end closure 10. The upper section 4 is formed from a tubular wall member 12. The tubular wall member 12 has a first inner diameter 14 at an open first end 16 and a second inner diameter 18 at an open second end 20. The upper section 4 also has a generally cylindrical inner surface 22 and a generally longitudinal slot 24 which forms a passage through the tubular wall member 12. The generally longitudinal slot 24 leads from the first end 16 of the tubular wall member 12 to a point between the first end 16 and the second end 20 of the tubular wall member 12.

The lower section 6 has an open first end 26 and an opposite second end 28 and is formed from a tubular wall member 30. The tubular wall member 30 has a generally frustoconical inner surface 34. The lower section 6 has a first inner diameter 32 at the first end 26 and a second inner diameter 36 at the second end 28. The second inner diameter 36 is smaller than the first inner diameter 32.

The end closure 10 is located at the second end 28 of the lower section 6.

The connecting means 8 attaches the second end 20 of the upper section 4 to the first end 26 of the lower section 6.

In a preferred embodiment, the connecting means 8 is formed from a generally annular wall member 38 which extends generally radially inwardly from the second end 20 of the upper section 4. This generally annular wall member 38 is attached to the second end 20 of the upper section 4 and to the first end 26 of the lower section 6. The first end 26 of the lower section 6 has a first inner diameter 32 smaller than the second inner diameter 20 at the second end 18 of the upper section 4.

In a preferred embodiment of the invention, the holder 2 has a mounting means 40 permanently attached to an outer surface 42 of the end closure 10.

Preferably, the holder 2 has a generally longitudinal slot 24 in the upper section 4. The generally longitudinal slot 24 starts from the first end 16 of the upper section 4 and extends substantially to the second end 20 of the upper section 4.

The annular wall member 38 of the holder 2 has an inner periphery 44 with an inner diameter 46 and an outer periphery 48 with an outer diameter 50. The inner diameter 46 is preferably in the range of from about 6.1 cm to about 8.3 cm and the outer diameter 50 is in the range of from about 7.3 cm to about 9.9 cm.

Preferably, the upper section 4 has a first inner diameter 14 in the range of from about 7.2 cm to about 9.8 cm and a second inner diameter 18 in the range of from about 7.3 cm to about 9.9 cm. The tubular wall member 12 of the upper section 4 preferably has a thickness in the range of from about 0.1 cm to about 0.5 cm.

Preferably, the lower section 6 has a first inner diameter 32 in the range of from about 6.12 cm to about 8.3 cm and a second inner diameter 36 in the range of from about 5.9 cm to about 7.9 cm. The tubular wall member 30 of the lower section 6 has a thickness in the range of from about 0.1 cm to about 0.5 cm.

The generally longitudinal slot 24 in the tubular wall member 12 of the upper section 4 preferably has a length as measured longitudinally in the range of from about 2.7 cm to about 3.7 cm and a width as measured circumferentially in the range of from about 2.3 cm to about 3.1 cm.

In a preferred embodiment of the invention, the lower section 6 of the holder 2 has an angle of convergence formed between the inner surface 34 of the tubular wall member 30 of the lower section 6 and a longitudinal axis running through the holder 2. This angle of convergence is preferably in the range of from about 5 degrees to about 15 degrees, usually in the range of from about 6 to about 10 degrees. Preferably, the angle of convergence of the lower section 6 is also formed if the first inner diameter 32 of the lower section 6 is in the range of from about 6.1 cm to about 8.3 cm, the second inner diameter 36 of the lower section 6 is in the range of from about 5.9 cm to about 7.9 cm, and the length of the lower section 6 as measured longitudinally is in the range of from about 2.7 cm to about 3.7 cm.

It is even more preferred that the lower section 6 of the holder has a generally frustoconical outer surface 52 diverging from the second end 28 of the lower section 6 toward the first end 26 of the lower section 6. It is also preferred to provide the lower section 6 with a generally cylindrical outer surface 52 extending from the first end 26 of the lower section 6 toward the second end 28 of the lower section 6.

In another embodiment of the invention, there is provided an apparatus 80 comprising a container 82 that is placed in a holder 2. The container 82 has a top end 84 and a bottom end 86. The top end 84 and the bottom end 86 are connected by a generally tubular wall member 88. The generally tubular wall member 88 has an outer surface 90 and a first outer diameter 92 at the top end 94 and a second outer diameter 96 at the bottom end 98.

Figure 8:
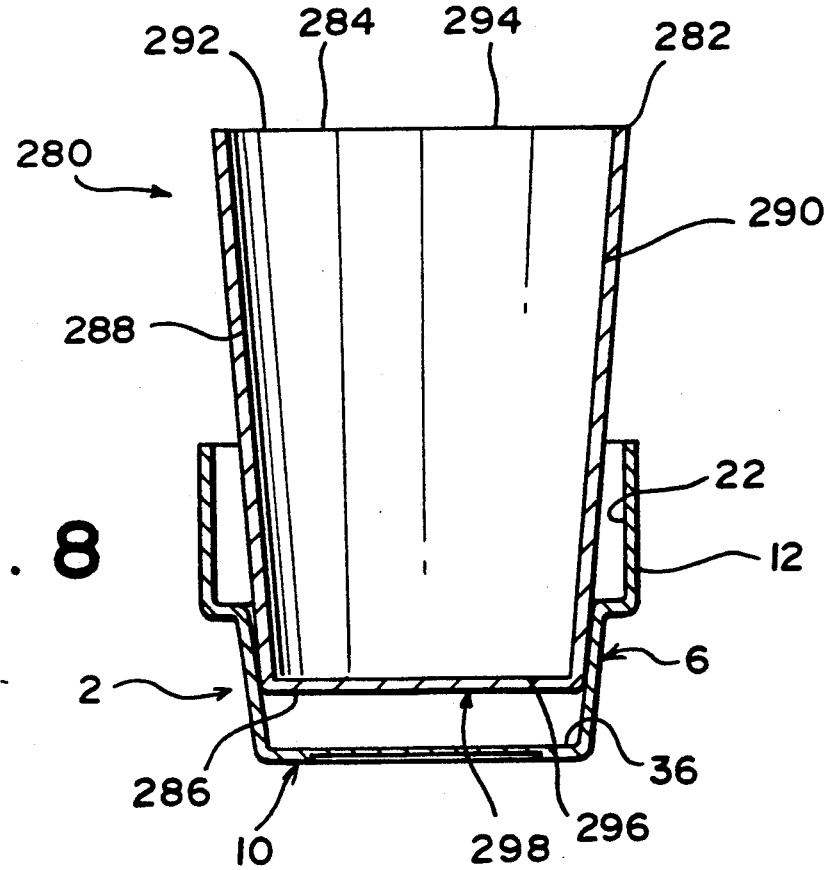
FIG. 8 is a cross-sectional view taken along lines 5—5 of FIG. 2 of the holder with a container positioned in the lower section of the holder.

In another preferred embodiment, (FIG. 8), the container 282 is placed in the lower section 6 of the holder 2, with the bottom end 286 of the container 282 resting on the frustoconical inner surface 34 of the tubular wall member 30 of the lower section 6 of the holder 2. For such an embodiment, the second outer diameter 296 of the container 282 is smaller than the first inner diameter 32 of the lower section 6. The holder 2 serves as a reservoir for spills. In a preferred embodiment, there exists an annular gap between the inner surface 22 of the tubular wall member 12 of the holder 2 and the outer surface 290 of the generally tubular wall member 288 of the container 282 such that a liquid spilling from the container 282 will pass through the annular gap and be collected in the holder 2.

In another preferred embodiment (FIG. 6), the container 182 is placed in the lower section 6 of the holder 2, with the bottom end 186 of the container 182 resting on the end closure 10 of the lower section 6 of the holder 2. In such an embodiment, the second outer diameter 196 of the container 182 is smaller than the second inner diameter 36 of the lower section 6 of the holder 2. Preferably, there exists an annular gap between the inner surface 22 of the tubular wall member 12 of the holder 2 and the outer surface 190 of the generally tubular wall member 188 of the container 182 such that a liquid spilling from the container 182 will pass through the annular gap and be collected in the holder 2.

In a preferred embodiment (FIG. 5), the container 82 is placed in the upper section 4 of the holder 2. Preferably, the bottom end 86 of the container 82 is positioned on the connecting means 8 of the holder 2. The second outer diameter 96 of the container 82 is preferably larger than the first inner diameter 32 of the lower section 6 which serves as a reservoir for spills from the container 82. In the illustrated embodiment, the container 82 has a handle 100 which is preferably positioned in the generally longitudinal slot 24 in the tubular wall member 12 of the upper section 4 of the holder 2. Preferably, there exists an annular gap between the inner surface 22 of the tubular wall member 12 of the upper section 4 of the holder 2 and the outer surface 90 of the generally tubular wall member 88 of the container 82 such that a liquid spilling from the container 82 will pass through the annular gap and be collected in the lower section 6 of the holder 2.

Although some differences exist between container 82, container 182, and container 282, the following methods apply to both containers. Thus, the references to container 82 and the sections of container 82 apply directly to containers 182 and 282 and the related sections of the containers, unless otherwise specified.

In one embodiment, a method for decreasing spills from a container 82 having liquids is specified. This method comprises positioning the container 82 in the upper section 4 of a holder 2, restraining movements of the container 82 inside the holder 2, directing a spill from the container 82 through an annular gap between the outer surface 90 of the generally tubular wall member 88 of the container 82 and the inner surface 22 of the tubular wall member 12 of the holder 2 into the lower section 6 of the holder 2, and collecting a spill from the container 82 in the holder 2 which serves as a reservoir. For container 82, a handle 100 on the container 82 is positioned in the preferably generally longitudinal slot 24 of the upper section 4 of the holder 2 while the container 82 rests on the connecting means 8 in order to restrain movements which cause spills.

In another embodiment, this method comprises positioning the container 82 on the frustoconical inner surface 34 of the tubular wall member 30 of the lower section 6 of the holder 2, restraining movements of the container 82 inside the holder 2, and collecting a spill from the container 82 in the holder 2 which serves as a reservoir.

In another embodiment, this method comprises positioning the container 82 on the end closure 10 of the holder 2, restraining movements of the container 82 inside the holder 2, and collecting a spill from the container 82 in the holder 2 which serves as a reservoir.

While certain preferred embodiments of the invention have been described hereinabove, the invention is not to be construed as so limited, except to the extent such limitations are found in the claims.

What is claimed is:

1. A holder comprising:
   (a) an upper section formed from a tubular wall member having a first inner diameter at an open first end and a second inner diameter at an open second end, a generally cylindrical inner surface and a generally longitudinal slot forming a passage through the tubular wall member, said slot leading from the first end of the tubular wall member to a point between the first end and the second end of the tubular wall member;
   (b) a lower section with an open first end and an opposite second end formed from a tubular wall member having a generally frustoconical inner surface, the lower section having a first inner diameter at the first end and a second inner diameter at the second end which is smaller than the first inner diameter;
   (c) an end closure located at the second end of the lower section; and
   (d) a connecting means attaching the second end of the upper section to the first end of the lower section.

2. The holder of claim 1 wherein the connecting means comprises a generally annular wall member extending generally radially inwardly from the second end of the upper section and attaching the second end of the upper section to the first end of the lower section, wherein the first end of the lower section has a first inner diameter smaller than the second inner diameter of the second end of the upper section.

3. The holder of claim 1 further comprising a mounting means permanently attached to an outer surface of the end closure.

4. The holder of claim 1 wherein the generally longitudinal slot of the upper section starts from the first end of the upper section and extends substantially to the second end of the upper section.

5. The holder of claim 1 wherein:
   (a) the annular wall member has an inner periphery with an inner diameter and an outer periphery with an outer diameter, with the inner diameter being in the range of from about 6.1 cm to about 8.3 cm and the outer diameter being in the range of from about 7.3 cm to about 9.9 cm;

(b) the upper section has a first inner diameter in the range of from about 7.2 cm to about 9.8 cm and a second inner diameter in the range of from about 7.3 cm to about 9.9 cm, and the tubular wall member of the upper section has a thickness in the range of from about 0.1 cm to about 0.5 cm;

(c) the lower section has a first inner diameter in the range of from about 6.1 cm to about 8.3 cm and a second inner diameter in the range of from about 5.9 cm to about 7.9 cm, and the tubular wall member of the lower section has a thickness in the range of from about 0.1 cm to about 0.5 cm; and (d) the generally longitudinal slot in the tubular wall member of the upper section has a length as measured longitudinally which is in the range of from about 2.7 cm to about 3.7 cm and a width as measured circumferentially which is in the range of from about 2.3 cm to about 3.1 cm.

6. The holder of claim 1 wherein the lower section has an angle of convergence formed between the inner surface of the tubular wall member of the lower section and a longitudinal axis running through the holder, the angle being in the range of from about 5 degrees to about 15 degrees.

7. The holder of claim 1 wherein the lower section has an angle of convergence formed by a first inner diameter of the lower section in the range of from about 6.1 cm to about 8.3 cm, a second inner diameter of the lower section in the range of from about 5.9 cm to about 7.9 cm, and a length of the lower section as measured longitudinally in the range of from about 2.7 cm to about 3.7 cm.

8. The holder of claim 1 wherein the lower section has a generally frustoconical outer surface diverging from the second end of the lower section toward the first end of the lower section.

9. The holder of claim 1 wherein the lower section has a generally cylindrical outer surface extending from the first end of the lower section toward the second end of the lower section.

10. An apparatus comprising:
a container with a top end and a bottom end, the top end and the bottom end connected by a generally tubular wall member having an outer surface and a first outer diameter at the top end and a second outer diameter at the bottom end; and
a holder with
an upper section formed from a tubular wall member having a first inner diameter at an open first end and a second inner diameter at an open second end, a generally cylindrical inner surface and a generally longitudinal slot forming a passage through the tubular wall member, said slot leading from the first end of the tubular wall member to a point between the first end and the second end of the tubular wall member;
a lower section with an open first end and an opposite second end formed from a tubular wall member having a generally frustoconical inner surface, the lower section having a first inner diameter at the first end and a second inner diameter at the second end which is smaller than the first inner diameter;
an end closure at the second end of the lower section; and
a connecting means attaching the second end of the upper section to the first end of the lower section; wherein:
the container is placed in the upper section of the holder, with the bottom end of the container positioned on the connecting means of the holder, and the second outer diameter of the container is larger than the first inner diameter of the lower section which serves as a reservoir for any spills from the container.

11. The apparatus of claim 10 wherein the container has a handle which is positioned in the generally longitudinal slot in the tubular wall member of the upper section of the holder.

12. The apparatus of claim 10 wherein there exists an annular gap between the inner surface of the tubular wall member of the upper section of the holder and the outer surface of the generally tubular wall member of the container such that a liquid spilling from the container will pass through the annular gap and be collected in the lower section of the holder.

13. An apparatus comprising:
a container with a top end and a bottom end, the top end and the bottom end connected by a generally tubular wall member having an outer surface and a first outer diameter at the top end and a second outer diameter at the bottom end; and
a holder with
an upper section formed from a tubular wall member having a first inner diameter at an open first end and a second inner diameter at an open second end, a generally cylindrical inner surface and a generally longitudinal slot forming a passage through the tubular wall member, said slot leading from the first end of the tubular wall member to a point between the first end and the second end of the tubular wall member;
a lower section with an open first end and an opposite second end formed from a tubular wall member having a generally frustoconical inner surface, the lower section having a first inner diameter at the first end and a second inner diameter at the second end which is smaller than the first inner diameter;
an end closure at the second end of the lower section; and
a connecting means attaching the second end of the upper section to the first end of the lower section;
wherein the container is placed in the lower section of the holder, with the bottom end of the container resting on the frustoconical inner surface of the tubular wall member of the lower section of the holder with the second outer diameter of the container being smaller than the first inner diameter of the lower section.

14. The apparatus in claim 13 wherein there exists an annular gap between the inner surface of the tubular wall member of the holder and the outer surface of the generally tubular wall member of the container such that a liquid spilling from the container will pass through the annular gap and be collected in the holder.

15. An apparatus comprising
a container with a top end and a bottom end, the top end and the botton end connected by a generally tubular wall member having an outer surface and a first outer diameter at the top end and a second outer diameter at the bottom end; and
a holder with
an upper section formed from a tubular wall member having a first inner diameter at an open first end and a second inner diameter at an open second end, a generally cylindrical inner surface and a generally longitudinal slot forming a passage through the tubular wall member, said slot leading from the first end of the tubular wall member to a point between the first end and the second end of the tubular wall member;

a lower section with an open first end and an opposite second end formed from a tubular wall member having a generally frustoconical inner surface, the lower section having a first inner diameter at the first end and a second inner diameter at the second end which is smaller than the first inner diameter;

an end closure at the second end of the lower section; and a connecting means attaching the second end of the upper section to the first end of the lower section;

wherein the container is placed in the lower section of the holder, with the bottom end of the container resting on the end closure of the lower section of the holder, with the second outer diameter of the container being smaller than the second inner diameter of the lower section of the holder.

16. The apparatus in claim 15 wherein there exists an annular gap between the inner surface of the tubular wall member of the holder and the outer surface of the generally tubular wall member of the container such that a liquid spilling from the container will pass through the annular gap and be collected in the holder.

17. A method for collecting spills from a container having liquids in an holder adapted for positioning in a vehicle console socket, said container comprising a top end and a bottom end, the top end with the bottom end connected by a generally tubular wall member having an outer surface and a first outer diameter at the top end and a second outer diameter at the bottom end, said method comprising:
  (a) positioning the holder in the vehicle console socket, said holder having
    an upper section formed from a tubular wall member having a first inner diameter at an open first end and a second inner diameter at an open second end, a generally cylindrical inner surface and a generally longitudinal slot forming a passage through the tubular wall member, said slot leading from the first end of the tubular wall member to a point between the first end and the second end of the tubular wall member;
    a lower section with an open first end and an opposite second end formed from a tubular wall member having a generally frustoconical inner surface, the lower section having a first inner diameter at the first end and a second inner diameter at the second end which is smaller than the first inner diameter;
    an end closure at the second end of the lower section; and
    a connecting means attaching the second end of the upper section to the first end of the lower section;
  (b) positioning the container in the holder such that the container is positioned in the upper section of the holder;
  (c) restraining movements of the container inside the holder;
  (d) directing a spill from the container through an annular gap between the outer surface of the generally tubular wall member of the container and the inner surface of the tubular wall member of the holder into the lower section of the holder; and
  (e) collecting a spill from the container in the holder which serves as a reservoir.

18. The method of claim 17 wherein a handle on the container is positioned in the generally longitudinal slot of the upper section of the holder while the container rests on the connecting means in order to restrain movements which cause spills.

19. A method for collecting spills from a container having liquids in an holder adapted for positioning in a vehicle console socket, said container comprising a top end and a bottom end, the top end and the bottom end connected by a generally tubular wall member having an outer surface and a first outer diameter at the top end and a second outer diameter at the bottom end, said method comprising:
  (a) positioning the holder in the vehicle console socket, said holder having
    an upper section formed from a tubular wall member having a first inner diameter at an open first end and a second inner diameter at an open second end, a generally cylindrical inner surface and a generally longitudinal slot forming a passage through the tubular wall member, said slot leading from the first end of the tubular wall member to a point between the first end and the second end of the tubular wall member;
    a lower section with an open first end and an opposite second end formed from a tubular wall member having a generally frustoconical inner surface, the lower section having a first inner diameter at the first end and a second inner diameter at the second end which is smaller than the first inner diameter;
    an end closure at the second end of the lower section; and
    a connecting means attaching the second end of the upper section to the first end of the lower section;
  (b) positioning the container in the holder such that the container is positioned on the frustoconical inner surface of the tubular wall member of the lower section of the holder;
  (c) restraining movements of the container inside the holder; and
  (d) collecting a spill in the holder which serves as a reservoir.

20. A method for collecting spills from a container having liquids in a holder adapted for positioning in a vehicle console socket, said container comprising a top end and a bottom end, the top end and the bottom end connected by a generally tubular wall member having an outer surface and a first outer diameter at the top end and a second outer diameter at the bottom end, said method comprising:
  (a) positioning the holder in the vehicle console socket, said holder having
    an upper section formed from a tubular wall member having a first inner diameter at an open first end and a second inner diameter at an open second end, a generally cylindrical inner surface and a generally longitudinal slot forming a passage through the tubular wall member, said slot leading from the first end of the tubular wall member to a point between the first end and the second end of the tubular wall member;
    a lower section with an open first end and an opposite second end formed from a tubular wall member having a generally frustoconical inner surface, the lower section having a first inner diameter at the first end and a second inner diameter at the second end which is smaller than the first inner diameter;

an end closure at the second end of the lower section; and a connecting means attaching the second end of the upper section to the first end of the lower section;

(b) positioning the container in the holder such that the container is positioned on the end closure of the holder;

(c) restraining movements of the container inside the holder; and (d) collecting a spill in the holder which serves as a reservoir.

* * * * *